United States Patent
Misaka

(10) Patent No.: US 9,420,136 B1
(45) Date of Patent: Aug. 16, 2016

(54) IMAGE READING DEVICE THAT DETERMINES SIZE OF DOCUMENT AND IMAGE FORMING APPARATUS HAVING THE SAME

(71) Applicants: KABUSHIKI KAISHA TOSHIBA, Tokyo (JP); TOSHIBA TEC KABUSHIKI KAISHA, Tokyo (JP)

(72) Inventor: Naoyuki Misaka, Mishima Shizuoka (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/741,010

(22) Filed: Jun. 16, 2015

(51) Int. Cl.
| | |
|---|---|
| G03G 15/00 | (2006.01) |
| G03G 21/00 | (2006.01) |
| H04N 1/00 | (2006.01) |
| H04N 1/04 | (2006.01) |
| G06T 1/00 | (2006.01) |
| G03B 27/62 | (2006.01) |

(52) U.S. Cl.
CPC ......... *H04N 1/00708* (2013.01); *H04N 1/0075* (2013.01); *H04N 1/00737* (2013.01); *H04N 1/00779* (2013.01); *H04N 2201/0081* (2013.01); *H04N 2201/0094* (2013.01)

(58) Field of Classification Search
CPC ......... G03G 15/00; G03G 21/00; H04N 1/00; H04N 1/04; G06T 1/00; G03B 27/62
USPC ........................................... 399/376
See application file for complete search history.

(56) References Cited

U.S. PATENT DOCUMENTS

| | | | | |
|---|---|---|---|---|
| 7,777,920 | B2 * | 8/2010 | Shoda | H04N 1/4095 358/463 |
| 8,014,044 | B2 * | 9/2011 | Shiga | H04N 1/00681 358/449 |
| 2010/0033769 | A1 * | 2/2010 | Shinkawa | H04N 1/00681 358/474 |
| 2010/0073721 | A1 * | 3/2010 | Ohk | H04N 1/00795 358/1.15 |
| 2010/0165423 | A1 * | 7/2010 | Okuzono | H04N 1/00835 358/488 |
| 2011/0043873 | A1 * | 2/2011 | Maruo | H04N 1/0071 358/475 |
| 2011/0043874 | A1 * | 2/2011 | Saika | H04N 1/0071 358/475 |
| 2012/0002246 | A1 * | 1/2012 | Shiraishi | G03G 15/607 358/475 |
| 2014/0085685 | A1 * | 3/2014 | Nanbu | H04N 1/00755 358/449 |
| 2015/0062664 | A1 * | 3/2015 | Hanamura | H04N 1/00708 358/449 |
| 2015/0181051 | A1 * | 6/2015 | Hirayama | H04N 1/0071 358/2.99 |
| 2016/0065778 | A1 * | 3/2016 | Yamada | H04N 1/053 358/488 |

FOREIGN PATENT DOCUMENTS

| | | | | | |
|---|---|---|---|---|---|
| JP | 2002290675 | A | * | 10/2002 | ............... G06T 1/00 |
| JP | 2011066579 | A | * | 3/2011 | ............... H04N 1/04 |
| JP | 2013110506 | A | | 6/2013 | |
| JP | 2013219760 | A | * | 10/2013 | ............... H04N 1/04 |

* cited by examiner

*Primary Examiner* — Nguyen Ha

(74) *Attorney, Agent, or Firm* — Patterson & Sheridan, LLP

(57) ABSTRACT

An image reading device includes a plate on which a document to be scanned is placed, a cover that is movable between an open position and a closed position at which the cover contacts the document, a position detecting unit configured to detect a position of the cover, an imaging unit configured to emit light towards the plate and having an image sensor configured to detect light reflected by the document, and a control unit configured to determine a size of the document based on a detection result of the position detecting unit and a detection result of the image sensor.

20 Claims, 10 Drawing Sheets

IMAGE READING DEVICE THAT DETERMINES SIZE OF DOCUMENT AND IMAGE FORMING APPARATUS HAVING THE SAME

FIELD

Embodiments described herein relate generally to an image reading device that determines a size of a document to be read and an image forming apparatus having the same.

BACKGROUND

In the related art, an image reading device determines a size of an original document using an image sensor used for reading the original document. The image sensor detects light emitted from a light source and reflected by the original document. Based on the intensity of the light detected by the image sensor, the image reading device determines the size of the original document.

However, when a platen cover is not closed, the plurality of sensors detects ambient light coming from outside of the image reading device. Hence, in some cases, the image reading device may not precisely determine the size of the original document.

DETAILED DESCRIPTION

In general, according to one embodiment, an image reading device includes a plate on which a document to be scanned is placed, a cover that is movable between an open position and a closed position at which the cover contacts the document, a position detecting unit configured to detect a position of the cover, an imaging unit configured to emit light towards the plate and having an image sensor configured to detect light reflected by the document, and a control unit configured to determine a size of the document based on a detection result of the position detecting unit and a detection result of the image sensor.

Figure 1:
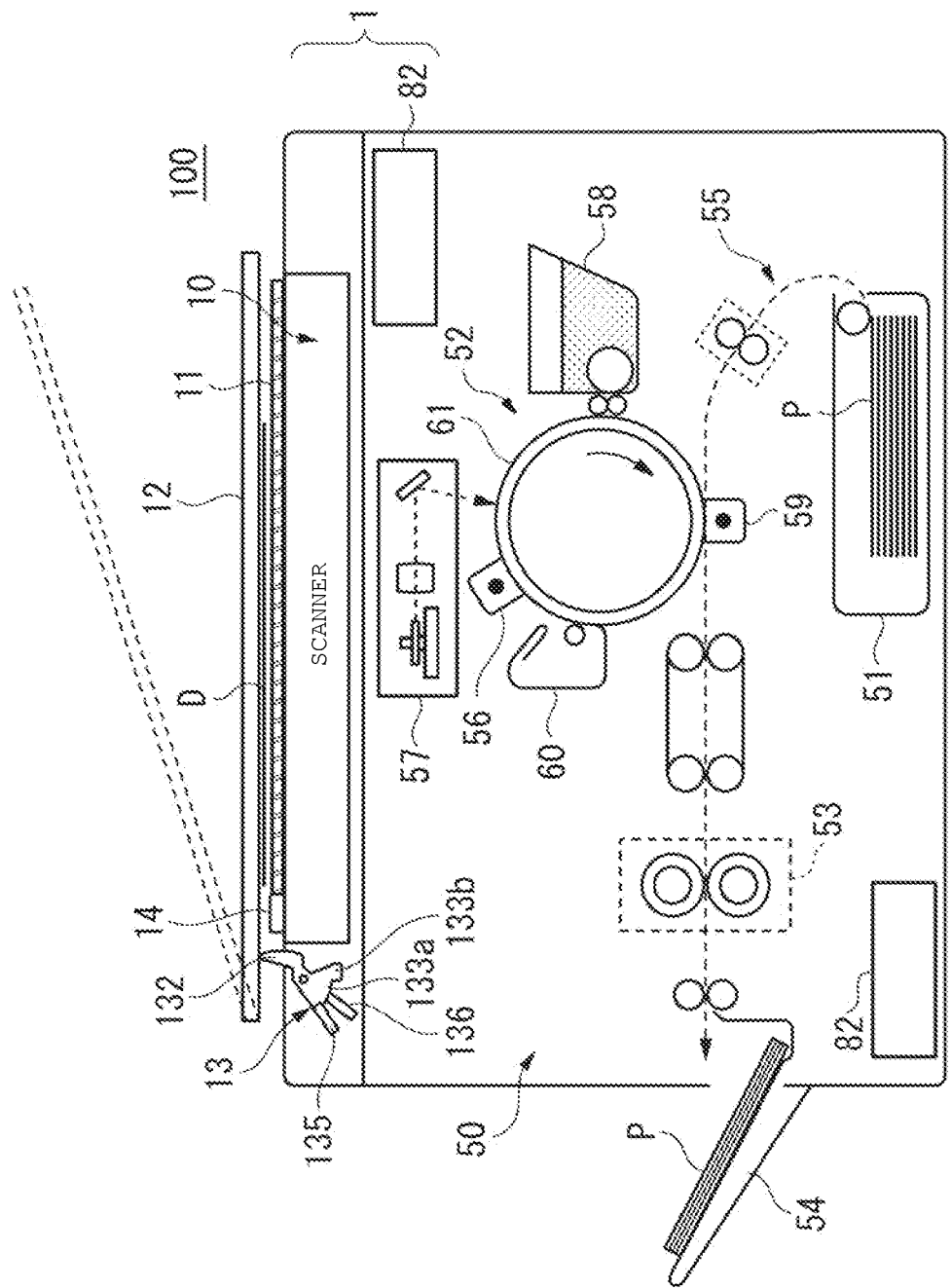
FIG. 1 is a schematic cross sectional view of an image forming apparatus including an image reading device according to an embodiment.

FIG. 1 is a schematic cross sectional view of an image forming apparatus 100 including an image reading device according to an embodiment. The image forming apparatus 100 includes an image reading device 1 and a printer unit 50. The image reading device 1 includes a scanner unit 10, a contact glass 11, a platen cover 12, an opening-closing position sensor unit 13, a white reference plate 14, and a control unit 82.

The scanner unit 10 is a device that reads an original document. The contact glass 11 is provided on an upper surface of the scanner unit 10. An original document D is placed on the contact glass 11. The original document D is placed such that a surface of the original document to be scanned faces the contact glass 11. The platen cover 12, which presses the original document D placed on the contact glass 11, is provided on an upper side of the contact glass 11 so as to be openable. That is, the platen cover 12 holds the original document D between the reading surface and the platen cover 12. A color of the surface of the platen cover 12 pressing the original document D is white or is close to white.

The opening-closing position sensor unit 13 detects a position of the platen cover 12 between an open position and a closed position of the platen cover 12. A position between the open position and the closed position corresponds to a degree of opening or closing of the platen cover 12. That is, the position thereof during opening or closing may be any state of a fully opened state, a half-closed state, and a fully closed state of the platen cover 12. The opening-closing position sensor unit 13 outputs the detected position of the platen cover 12 between the open position and the closed position of the platen cover 12 to the control unit 82.

The white reference plate 14 is disposed at a predetermined position closer to a home position than the position of the contact glass 11. For example, the white reference plate 14 is used in order to acquire shading correction data.

The printer unit 50 forms an image on a medium based on image data which is output from the scanner unit 10.

Figure 2:
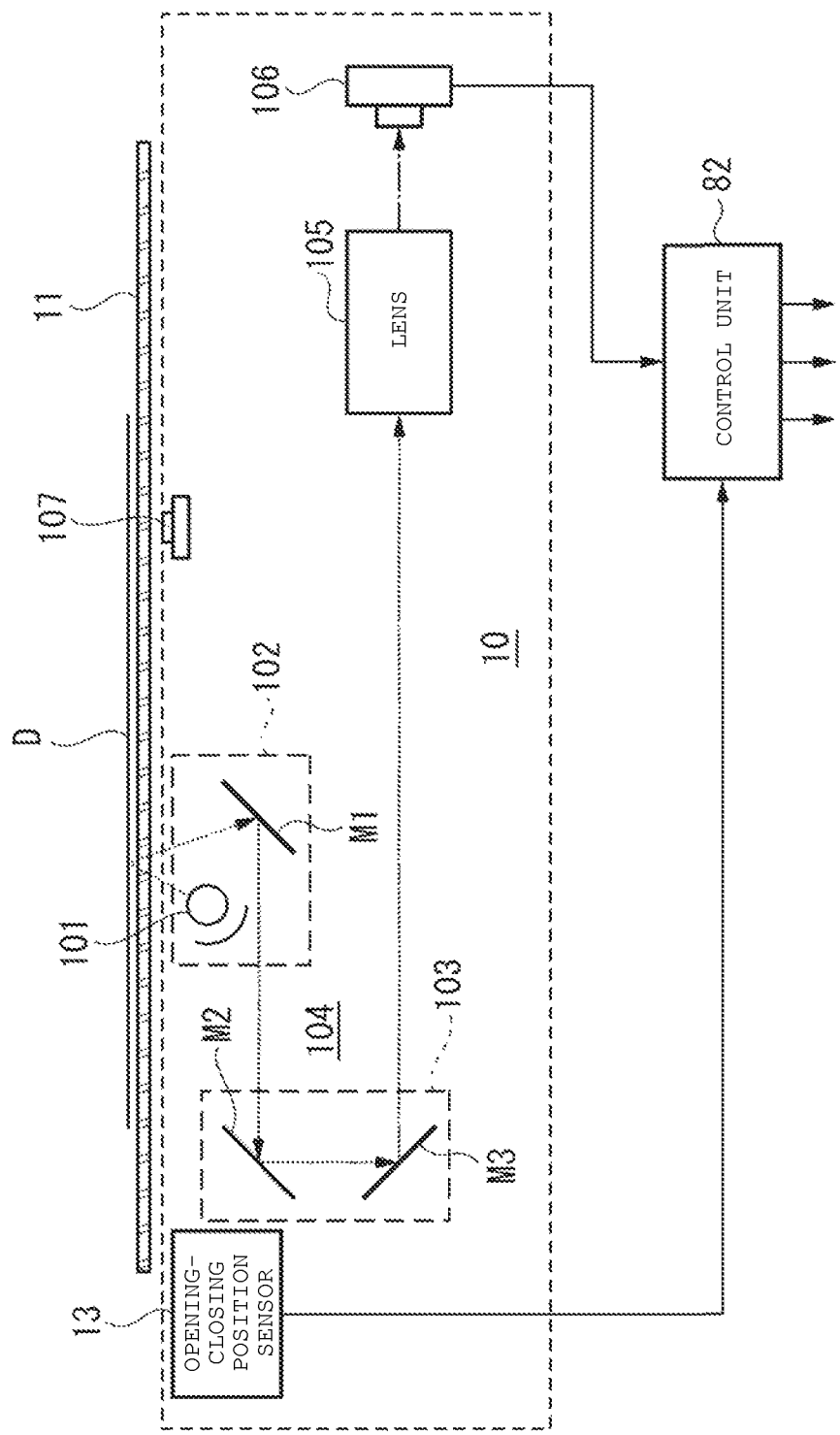
FIG. 2 illustrates a scanner unit of the image reading device according to the embodiment.
Figure 3:
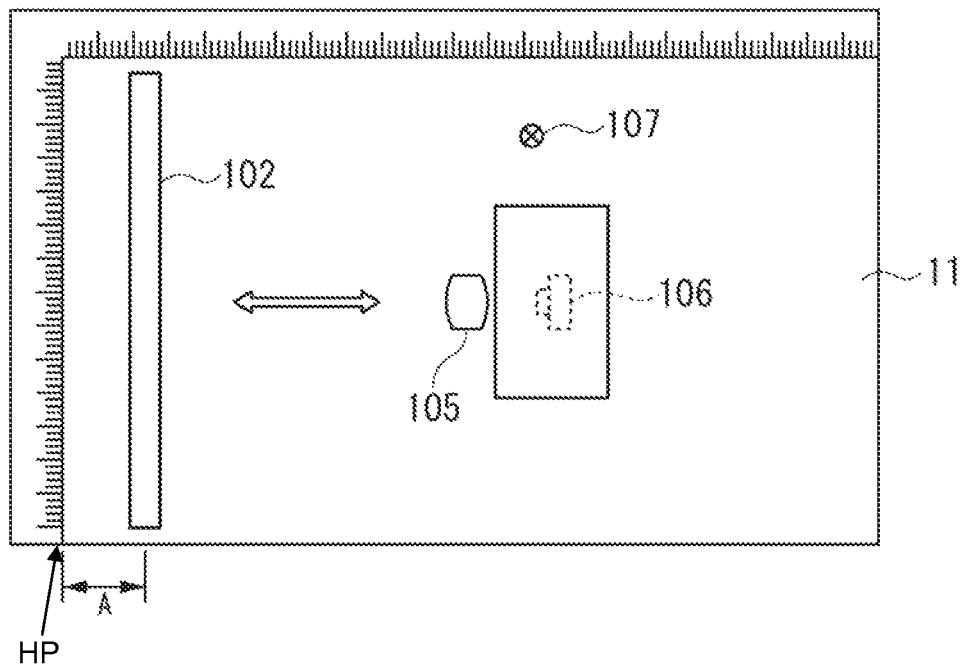
FIG. 3 is a top plan view of a contact glass of the image reading device according to the embodiment.

FIG. 2 illustrates a schematic configuration of the scanner unit 10. FIG. 3 is a top plan view of the contact glass 11.

The scanner unit 10 includes a first carriage 102, a second carriage 103, an exposure scanning section 104, an imaging lens 105, a line sensor 106, and a position sensor 107.

The first carriage 102 reciprocates in the sub-scanning direction along the contact glass 11. The first carriage 102 includes a light source 101 and a first mirror M1. The light source 101 emits light in accordance with a driving signal from the control unit 82.

The second carriage 103 also reciprocates in the sub-scanning direction along the contact glass 11. The second carriage 103 includes a second mirror M2 and a third mirror M3.

The first mirror M1 reflects light, which is reflected by the original document D, toward the second mirror M2. The light, which is reflected by the first mirror M1, is reflected sequentially by the second mirror M2 and the third mirror M3, and is guided to the imaging lens 105. In addition, the first carriage 102 and the second carriage 103 are moved by a driving source (not illustrated) so as to perform scanning in the sub-scanning direction. For example, a speed ratio of the first carriage 102 and the second carriage 103 is 2:1 so as to keep an optical path length constant all the time.

The imaging lens 105 forms an image of the light by the original document D on the line sensor 106. The reflected light is guided by the first mirror M1, the second mirror M2, and the third mirror M3.

The line sensor 106 photoelectrically converts the light, which is reflected by the original document D and directed onto the line sensor 106, into a luminance value. For example, the luminance value is a voltage value with a magnitude corresponding to an intensity of the light which is reflected by the original document D. If the luminance value is large, the corresponding region of the original document D is white. If the luminance value is small, the corresponding region of the original document D is black. The line sensor 106 outputs the luminance values to the control unit 82. For example, the line sensor 106 is a CCD image sensor.

The position sensor 107 is positioned to face the contact glass 11. The position sensor 107 is used to determine the size of the original document D in the sub-scanning direction. If the position sensor 107 detects the original document D, the position sensor 107 outputs an APS signal to the control unit 82. The APS signal is a signal indicating that the original document D is detected. For example, the position sensor 107 is an active pixel sensor (APS). HP is a home position at which the original document is set. A is a distance by which the first carriage 102 is moved when the line sensor 106 is operated to detect the size of the original document D in the main scanning direction. The detection of the size of the original document D is performed with the first carriage 102 being at a position that is apart from an edge of the contact glass 11 by the distance of A.

Figure 4:
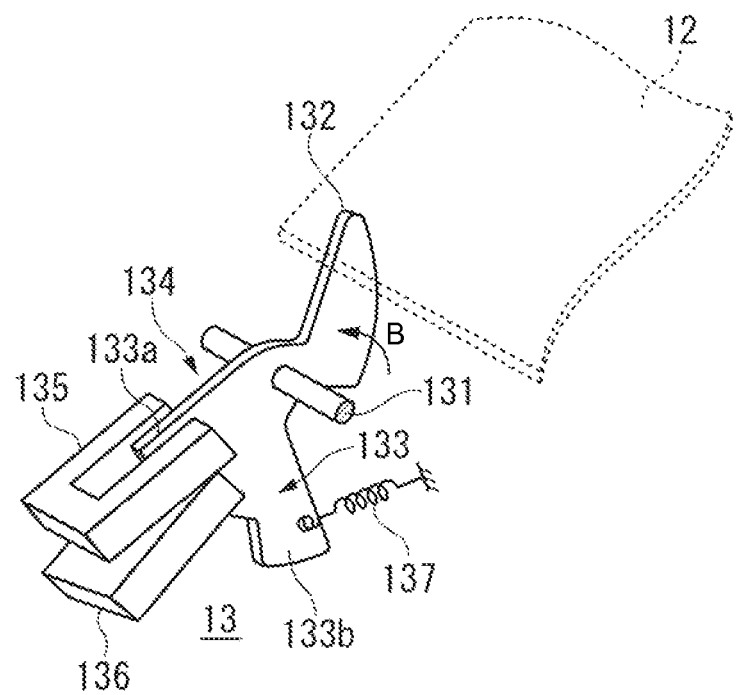
FIG. 4 is a perspective view of an opening-closing position sensor of the image reading device according to the embodiment.

FIG. 4 is a perspective view of the opening-closing position sensor unit 13. The opening-closing position sensor unit 13 is disposed around a spindle 131 around which the platen cover 12 is moved for opening or closing. The opening-closing position sensor unit 13 includes a rotation member 134, a first detection portion 135, and a second detection portion 136.

The rotation member 134 is supported around the spindle 131 so as to be rotatable. For example, the rotation member 134 is urged toward a direction to open the platen cover 12 by a spring 137. The direction to open the platen cover is a direction of an outlined arrow B. The rotation member 134 has a movable portion 132 and a shutter portion 133. The shutter portion 133 includes a first shutter 133a and a second shutter 133b.

An ON state and an OFF state of the first detection portion 135 are switched in accordance with the position of the first shutter 133a, while the rotation member 134 rotates. An ON state and an OFF state of the second detection portion 136 are switched in accordance with the position of the second shutter 133b, while the rotation member 134 rotates.

Figure 5:
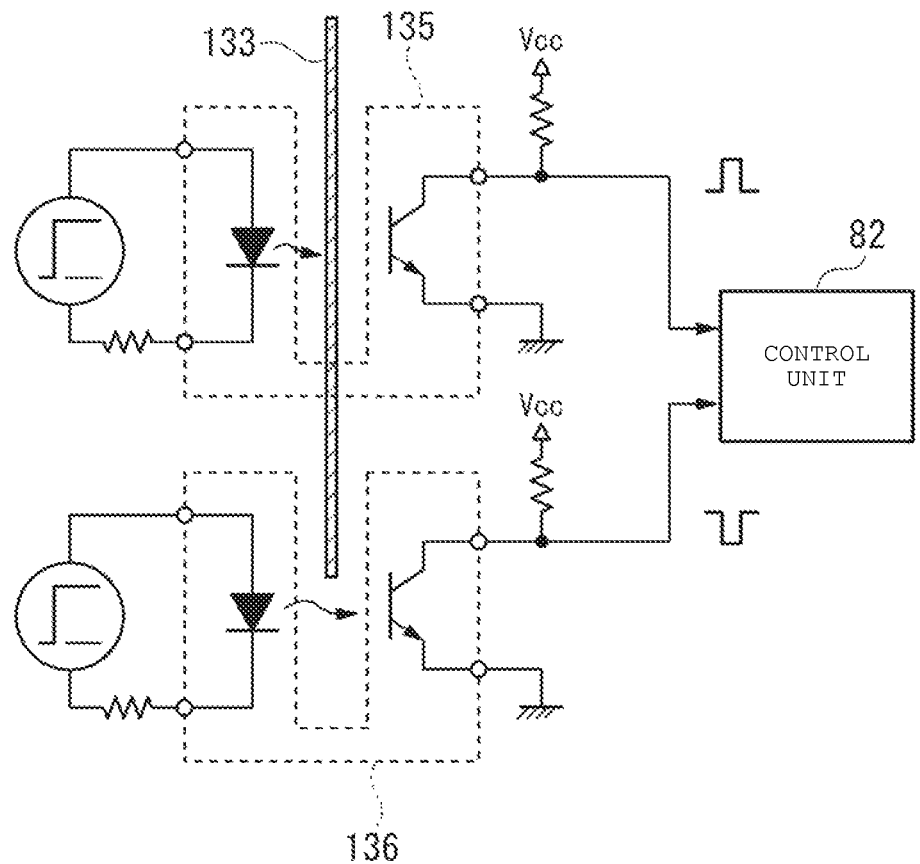
FIG. 5 is a circuit diagram of a first detection portion and a second detection portion of the image reading device according to the embodiment.

FIG. 5 is a circuit diagram of the first detection portion 135 and the second detection portion 136. The first detection portion 135 includes a light emitting element and a light receiving element. The light receiving element is disposed at a place where the light receiving element is able to receive light from the light emitting element. If the light receiving element receives light from the light emitting element, the light receiving element makes an output of an L level. If the shutter portion 133 blocks the light emitted from the light emitting element, the light receiving element does not receive light. If the light receiving element does not receive light, the light receiving element makes an output of an H level. The second detection portion 136 has the same configuration as the first detection portion 135.

Figure 6A:
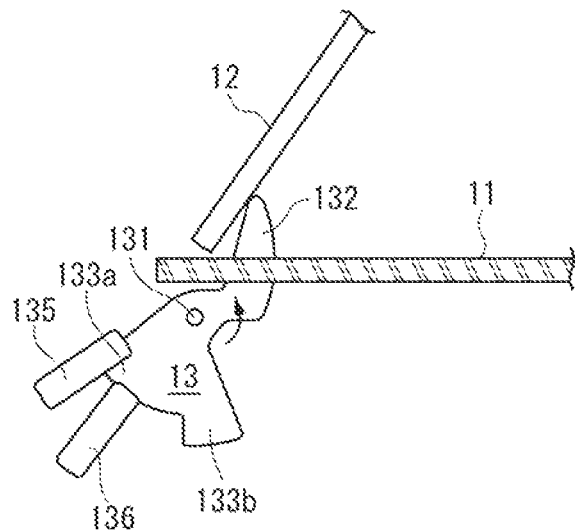
FIG. 6A illustrates the platen cover of the image reading device according to the embodiment that is at a first position.

Next, a description will be given of a relationship between the position of the platen cover 12 between the open position and the closed position of the platen cover 12 and the position of the opening-closing position sensor unit 13. FIG. 6A illustrates a situation in which the platen cover 12 is at a first position. The first position is a position at which the platen cover 12 is in an (fully) opened state. When the platen cover 12 is at the first position, the light receiving elements of the first detection portion 135 and the second detection portion 136 receives light from the light emitting elements. Consequently, the outputs of the first detection portion 135 and the second detection portion 136 are at the L level.

Figure 6B:
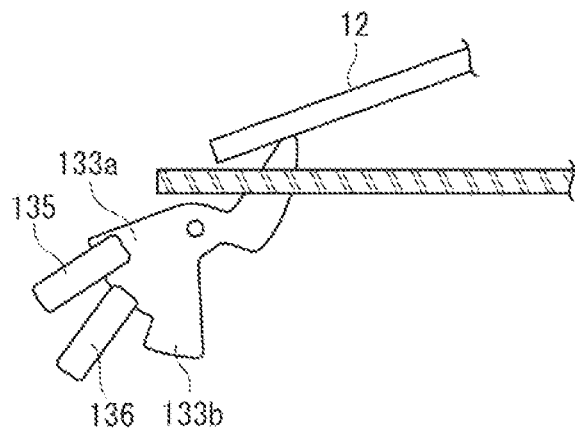
FIG. 6B illustrates the platen cover at a second position.

FIG. 6B illustrates a situation in which the platen cover 12 is at a second position. The second position is a position at which the platen cover 12 is in the half-closed (partially opened) state. When the platen cover 12 is at the second position, the light receiving element of the first detection portion 135 is shielded by the shutter portion 133 and light emitted from the light emitting element is blocked thereby. Thus, the light receiving element of the first detection portion 135 does not receive the light from the light emitting element. Consequently, the output of the first detection portion 135 is at the H level. In contrast, the light receiving element of the second detection portion 136 is not shielded by the shutter portion 133 and light emitted from the light emitting element is blocked thereby. Thus, the second detection portion 136 receives the light from the light emitting element. Consequently, the output of the second detection portion 136 is at the L level.

Figure 6C:
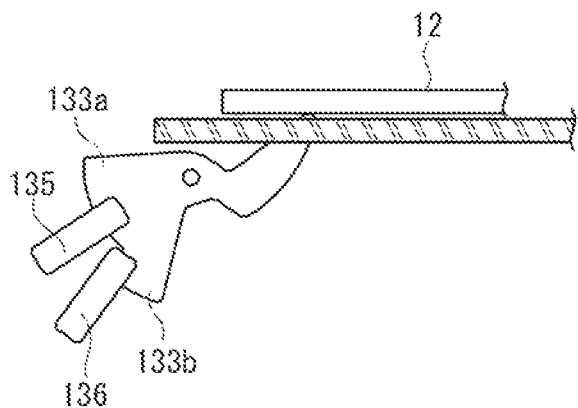
FIG. 6C illustrates the platen cover at a third position.

FIG. 6C illustrates a situation in which the platen cover 12 is at a third position. The third position is a position at which the platen cover 12 is in the (fully) closed state. When the platen cover 12 is at the third position, the light receiving element of the first detection portion 135 is shielded by the shutter portion 133 and light emitted from the light emitting element is blocked thereby. Thus, the light receiving element of the first detection portion 135 does not receive the light from the light emitting element. Consequently, the output of the first detection portion 135 is at the H level. Similarly, the light receiving element of the second detection portion 136 is shielded by the shutter portion 133 and light emitted from the light emitting element is blocked thereby. Thus, the second detection portion 136 does not receive the light from the light emitting element. Consequently, the output of the second detection portion 136 is at the H level.

The outputs of the first detection portion 135 and the second detection portion 136 are supplied to the control unit 82.

The printer unit 50 includes a medium holding unit 51, a printer engine 52, a fixing unit 53, a discharge unit 54, and a medium passage path 55.

The medium holding unit 51 stores a sheet-like printing medium P. The printer unit 50 sends the printing medium P, which is stored in the medium holding unit 51, to the printer engine 52 through the medium passage path 55.

The printer engine 52 includes an electrifier 56, exposure unit 57, a developing unit 58, a transfer unit 59, a cleaner 60, and a photoconductor 61. The printer engine 52 transfers a toner image, which is formed on a surface of the photoconductor 61, to the printing medium P. The printer engine 52 fixes the transferred toner image onto the printing medium P through the fixing unit 53.

The printer unit 50 discharges the printing medium P, which is subjected to the fixing process, to the discharge unit 54. The printer engine 52 forms an image employing an electrophotography method as an example, but the embodiment is not limited to this method.

Figure 7:
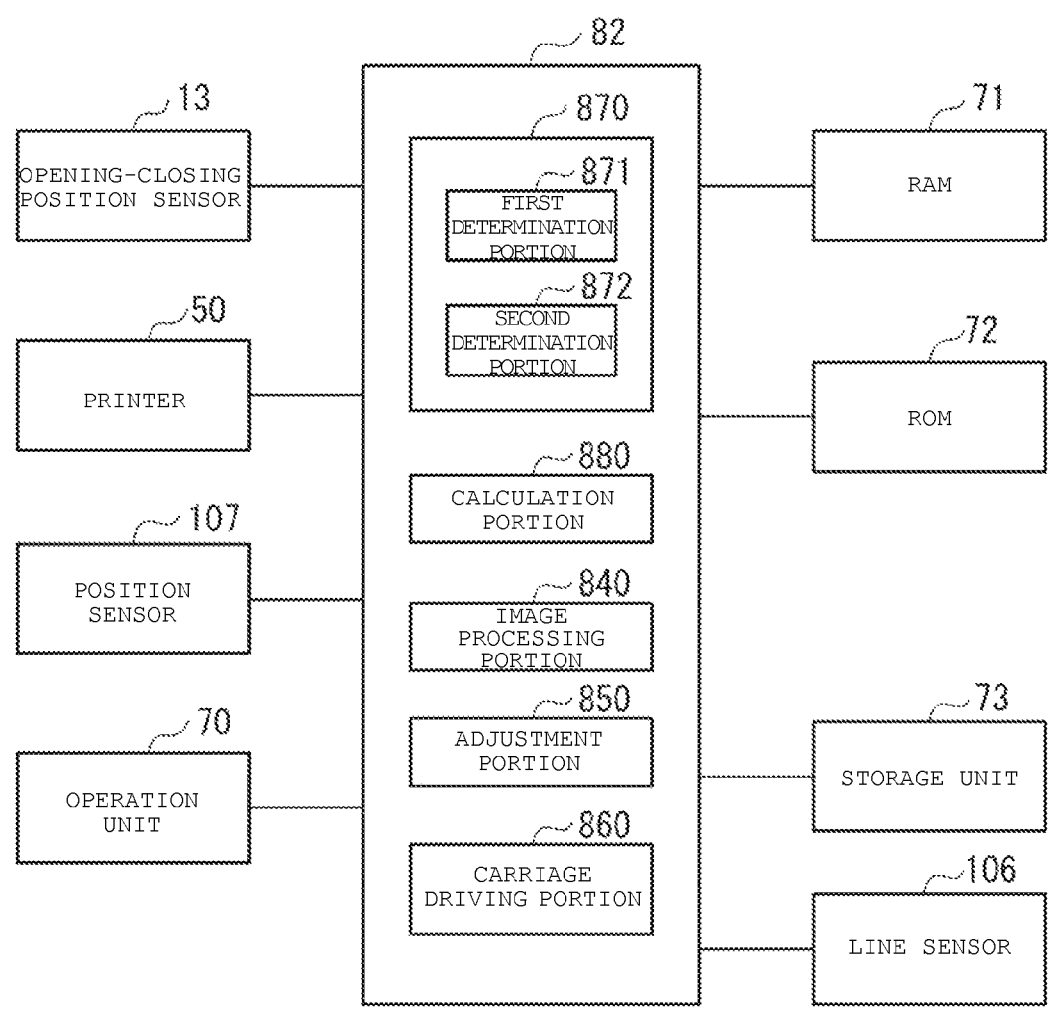
FIG. 7 is a control block diagram of an image forming apparatus according to the embodiment.

FIG. 7 is a control block diagram of the image reading device 1. The control unit 82 is connected to the opening-closing position sensor unit 13, the printer unit 50, the position sensor 107, an operation unit 70, a RAM 71, a ROM 72, a storage unit 73, and the line sensor 106.

The operation unit 70 functions as a user interface. Based on an operation performed by an operator, the operation unit 70 outputs operation information, which is based on the operation, to the control unit 82. The operation unit 70 includes an operation section and a display section. The operation section receives the operation performed by the operator. For example, the display section displays operation guide to the operator.

The RAM 71 is a buffer memory that temporarily stores data which is generated during execution of each program. The ROM 72 stores various control programs which are necessary in order for the image reading device 1 to be operated. The ROM 72 stores respective programs for controlling an image reading operation, an image forming operation, and an image decoloring operation. Execution of the respective programs is controlled by the control unit 82.

The control unit 82 includes an image processing portion 840, an adjustment portion 850, a carriage driving portion 860, a determination portion 870, and a calculation portion 880.

The image processing portion 840 acquires white (luminance) reference data SD by measuring luminance of the white reference plate 14. The image processing portion 840 outputs the acquired white reference data SD to the calculation portion 880 of the control unit 82. The image processing portion 840 executes shading correction by using the white reference data SD. The image processing portion 840 executes an image reading operation.

The adjustment portion 850 executes an initial operation of the scanner unit 10. Examples of the initial operation include reference position adjustment, light intensity adjustment of the light source, and CCD output adjustment.

The carriage driving portion 860 moves the first carriage 102.

The determination portion 870 includes a first determination portion 871 and a second determination portion 872. The first determination portion 871 acquires the outputs from the first detection portion 135 and the second detection portion 136. The first determination portion 871 determines the position of the platen cover 12, based on the outputs from the first detection portion 135 and the second detection portion 136.

Figures 8, 9:
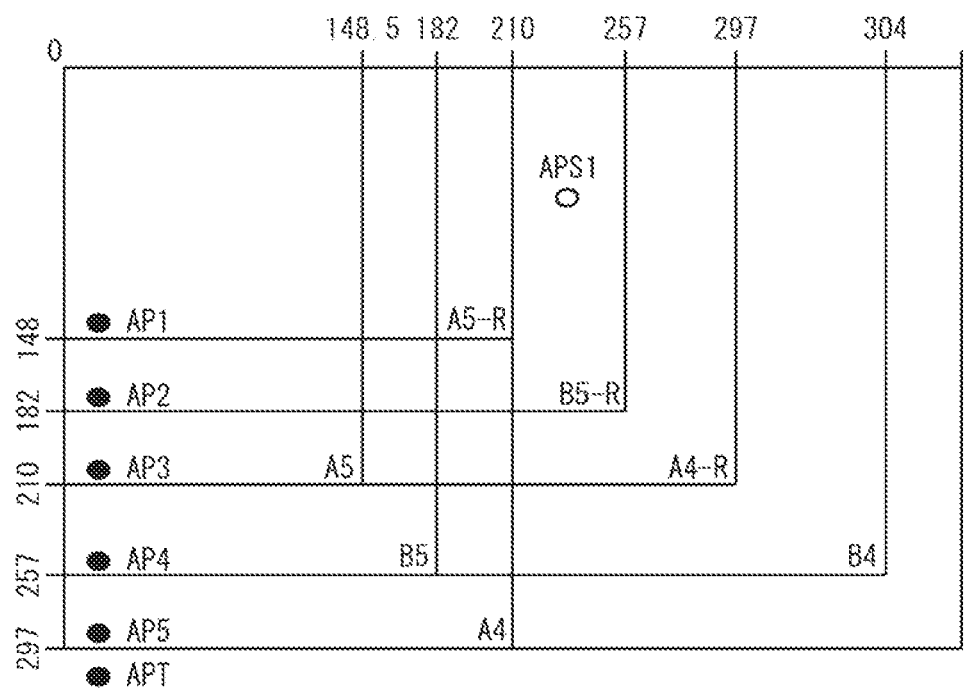
FIG. 8 illustrates correspondence between outputs of first and second detection portions and the position of the platen cover.
FIG. 9 illustrates detection positions where a line sensor of the image reading device according to the embodiment measures luminance values.

FIG. 8 is a table of correspondence between the positions of the platen cover 12 and the outputs of the first detection portion 135 and the second detection portion 136.

If the outputs of the first detection portion 135 and the second detection portion 136 are both at the L level, the first determination portion 871 determines that the platen cover 12 is at the first position. If the outputs of the first detection portion 135 and the second detection portion 136 are both at the H level, the first determination portion 871 determines that the platen cover 12 is at the third position. If the outputs of the first detection portion 135 and the second detection portion 136 are in a condition other than the two conditions, the first determination portion 871 determines that the platen cover 12 is at the second position. The condition other than the two conditions means that the output of the first detection portion 135 is at the H level and the output of the second detection portion 136 is at the L level.

The second determination portion 872 acquires the APS signal from the position sensor APS. The second determination portion 872 also acquires luminance values of a plurality of detection positions AP1-AP5 and APT from the line sensor 106. FIG. 9 illustrates the detection positions where the line sensor 106 measures the luminance values.

The detection positions AP1 to AP5 and APT indicate detection positions of the line sensor 106 to determine the size of the original document D on the contact glass 11 in the main scanning direction. Here, APS1 indicates the position sensor APS used to determine the size of the original document D in the sub-scanning direction. The second determination portion 872 is able to determine sizes of a plurality of original documents based on combination of the APS signal and the luminance values at the detection positions AP1 to AP5.

The second determination portion 872 stores the APS signal, which is acquired from the position sensor APS, in the storage unit 73. The second determination portion 872 determines whether or not the respective luminance values at the detection positions AP1 to AP5 are greater than a predetermined threshold value.

If the platen cover 12 is at the second position, the second determination portion 872 reads a first threshold value from the storage unit 73. The second determination portion 872 sets the read first threshold value as the predetermined threshold value, and determines whether or not each of the luminance values is greater than the first threshold value. If a luminance value is greater than the first threshold value, the second determination portion 872 determines that the original document D is at the detection position corresponding to the luminance value. The first threshold value is a value that is set depending on the effect of the outside light.

If the platen cover 12 is at the third position, the second determination portion 872 reads a second threshold value from the storage unit 73. The second determination portion 872 sets the read second threshold value as the predetermined threshold value, and determines whether or not each of the luminance values is equal to or less than the read threshold value. If a luminance value is equal to or less than the second threshold value, the second determination portion 872 determines that the original document D is at the detection position corresponding to the luminance value. The second threshold value is stored in the storage unit 73 in advance.

As described above, the second determination portion 872 is different in a standard of detecting whether or not the original document exists at the detection position, depending on the position of the platen cover 12. Here, a method of determining the size of the original document in the case where the platen cover 12 is at the second position is referred to as first original document size determination. The method of determining the size of the original document in the case where the platen cover 12 is at the third position is referred to as second original document size determination.

Hereinafter, the first original document size determination will be described.

Here, it is assumed that a user places an original document of A5 size on the contact glass 11 such that the original document is horizontally long (A5-R in FIG. 9). If the platen cover 12 is at the second position, the second determination portion 872 determines that the luminance value at the detection position AP1 is greater than the first threshold value and that the luminance values at the detection positions AP2-AP5 are smaller than the first threshold value. Consequently, the second determination portion 872 determines that the original document has A5 size (A5-R). If the original document of B5 size is placed to be horizontally long (B5-R in FIG. 9), the second determination portion 872 determines that the luminance value at the detection position AP2 is greater than the first threshold value and that the luminance values at the detection positions AP3-AP5 are smaller than the first threshold value. Consequently, the second determination portion 872 determines that the original document has the B5 size (B5-R).

If the luminance value at the detection position AP3 is greater than the first threshold value and the luminance values at the detection positions AP4-AP5 are smaller than the first threshold value, the second determination portion 872 determines that the size of the original document is A5 or A4-R. If the luminance value at the detection position AP4 is greater than the first threshold value and the luminance value at the detection positions AP5 is smaller than the first threshold value, the second determination portion 872 determines that the size of the original document is B5 or B4. If the luminance value at the detection position AP5 is greater than the first threshold value, the second determination portion 872 determines that the size of the original document is A4 or A3.

The calculation portion 880 acquires the white reference data from the image processing portion 840. The calculation portion 880 acquires the luminance value at the detection position APT from the line sensor 106. The detection position APT is set outside a region of the maximum size of the width of the original document. That is, the detection position APT is set in a region other than a position in which the original document is supposed to be placed. Further, the detection position APT is set at a position where disturbance (i.e., light coming into the reading section from outside) may be detected.

When the platen cover 12 is at the second position, the calculation portion 880 calculates the first threshold value based on the white reference data and the luminance value at the detection position APT. For example, the calculation portion 880 calculates an average value between the white reference data and the luminance value at the detection position APT, as the first threshold value. The calculation portion 880 outputs the calculated luminance value to the second determination portion 872. The first threshold value and the luminance value will be described below.

Figure 10A:
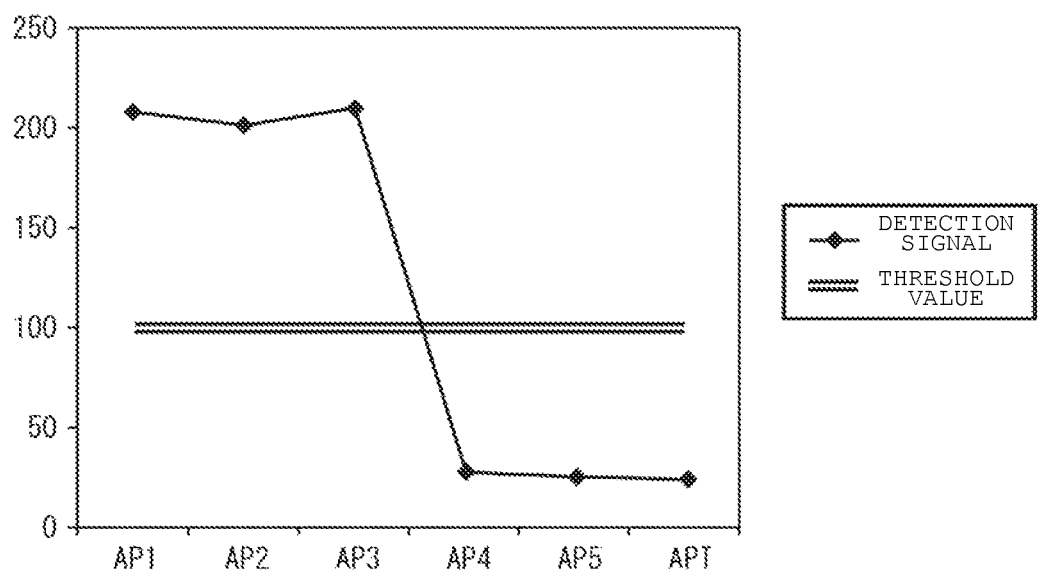
FIG. 10A illustrates an example of luminance values of detection positions when there is no outside light.

FIG. 10A illustrates an example of the luminance values at the detection positions AP1 to AP5 and APT when there is no outside light (i.e., the platen cover 12 is at the third position). Here, the first threshold value is set to 100, and it is assumed that the original document of A5 or A4-R size is placed on the contact glass 11.

Figure 10B:
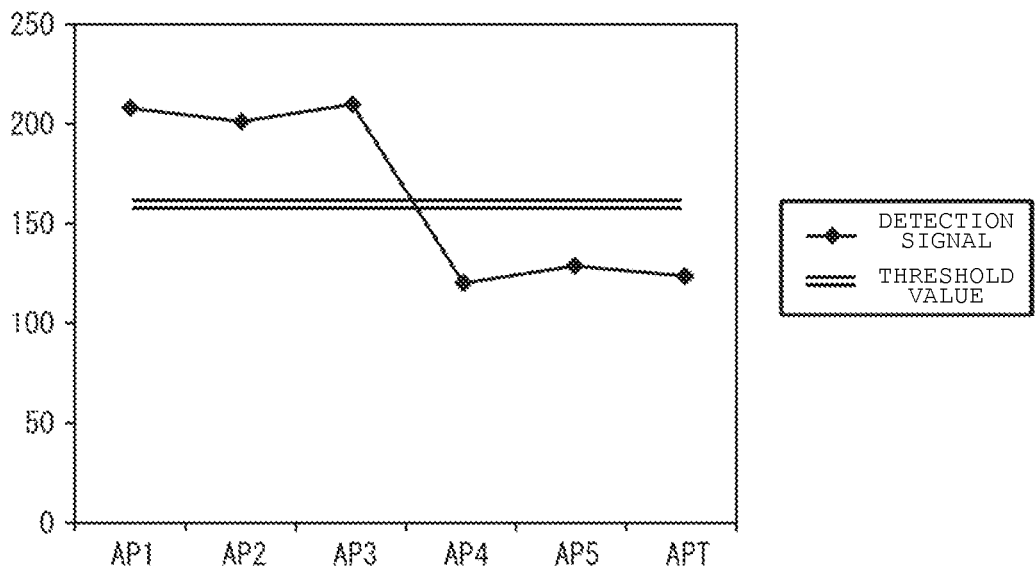
FIG. 10B illustrates an example of the luminance values at the detection positions when there is outside light.

FIG. 10B illustrates an example of the luminance values at the detection positions AP1 to AP5 and APT when there is outside light with the same original document being placed on the contact glass 11. That is, the platen cover 12 is at the second position, and thus the outside light reaches the contact glass 11. Consequently, the luminance values at AP4 to APT become greater than that in the case where there is no outside light as shown in FIG. 10A. The calculation portion 880 determines the first threshold value based on the white reference data and the luminance value of the outside light acquired at the detection position APT. Therefore, even if there is outside light, it is possible to determine the size of the original document placed on the contact glass 11. The first threshold value is not limited to the average value of the white reference data and the luminance value at the detection position APT. For example, the first threshold value may be a weighted average value of the white reference data and the luminance value at the detection position APT. That is, the first threshold value may be calculated using any method.

Figure 11:
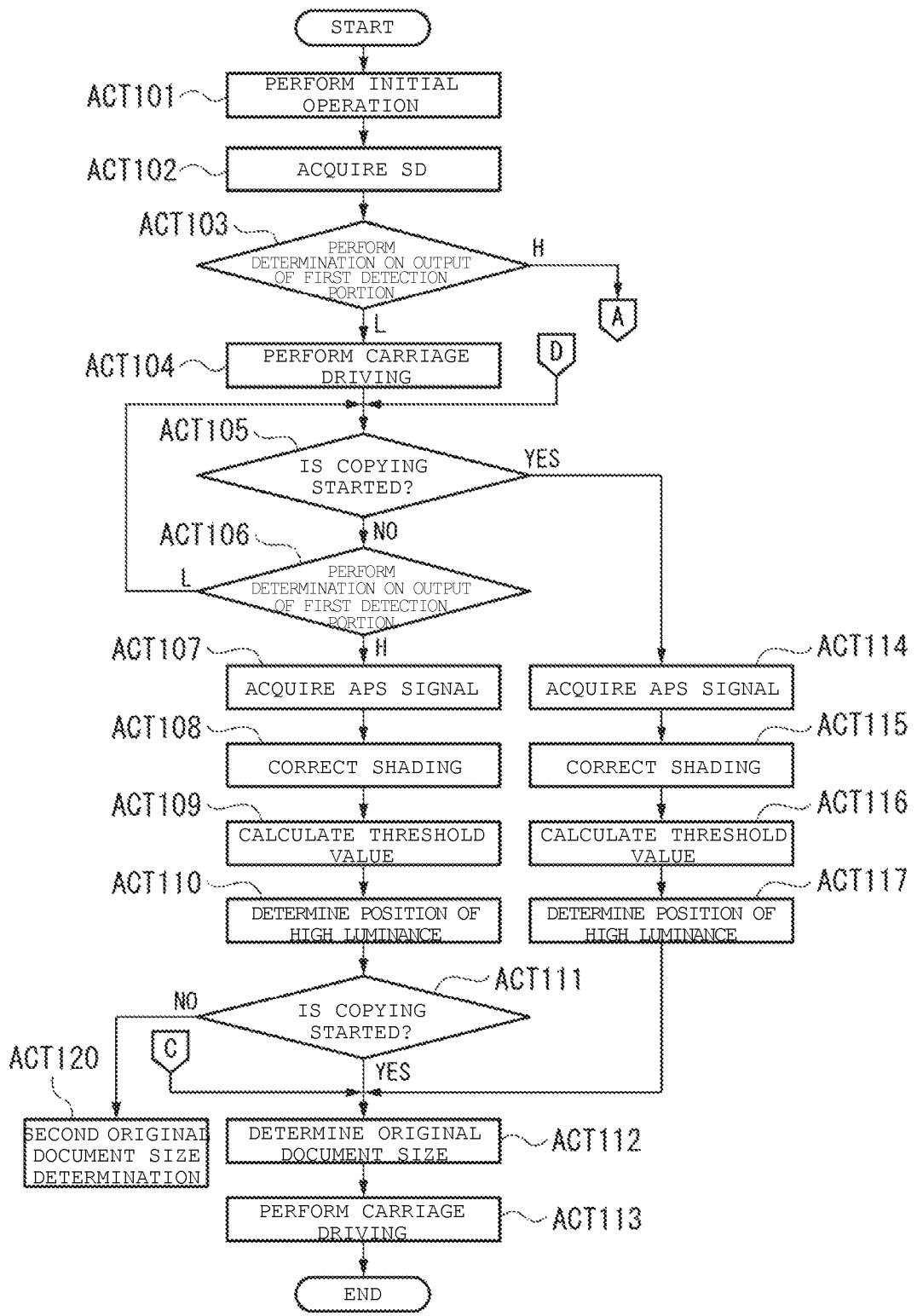
FIG. 11 is a flowchart of an operation of first original document size detection according to the embodiment.

Next, the first original document size determination will be described with reference to FIG. 11. FIG. 11 is a flowchart of the first original document size determination in the exemplary embodiment. Here, the platen cover 12 is opened, and the first carriage 102 is located at a position apart from the edge of the contact glass 11 by the distance of A in FIG. 3.

The adjustment portion 850 executes an initial operation of the scanner unit 10 (ACT101).

The image processing portion 840 acquires white color reference data SD obtained by reading the white reference plate 14 (ACT102).

The first determination portion 871 acquires the output from the first detection portion 135. The first determination portion 871 determines whether the output from the first detection portion 135 is at the L level or the H level (ACT103). If the output from the first detection portion 135 is at the L level, the carriage driving portion 860 operates to move the first carriage 102 to a predetermined position (ACT104). The predetermined position is a position corresponding to positions of the detection positions AP1 to AP5 and APT. If the output from the first detection portion 135 is at the H level, the control unit 82 determines whether or not a start switch of copying is turned on through the operation unit 70 (ACT207).

The control unit 82 determines whether or not the start switch of copying is turned on in the operation unit 70 (ACT105). If the start switch is not turned on (ACT105: NO), the control unit 82 proceeds to the process of ACT106.

The first determination portion 871 re-determines whether the output of the first detection portion 135 is at the L level or the H level (ACT106). If the output of the first detection portion 135 is at the L level, the control unit 82 goes back to ACT105. If the output of the first detection portion 135 is at the H level, the second determination portion 872 acquires the APS signal from the position sensor APS (ACT107).

Then, the image processing portion 840 executes the image reading operation and the shading correction (ACT108).

The control unit 82 turns on the light source 101. The calculation portion 880 acquires the white reference data from the image processing portion 840. The calculation portion 880 acquires the luminance value at the detection position APT from the line sensor 106. The calculation portion 880 calculates an average value of the white reference data and the luminance value at the detection position APT, as the first threshold value (ACT109). The calculation portion 880 outputs the calculated first threshold value to the second determination portion 872.

The second determination portion 872 acquires the luminance values at the detection positions AP1 to AP5 from the line sensor 106. The second determination portion 872 determines whether or not the respective luminance values at the detection positions AP1 to AP5 are greater than the first threshold value. The second determination portion 872 stores the detection position at which the luminance value is greater than the first threshold value, and the luminance value thereof in the storage unit 73 (ACT110).

The control unit 82 determines whether or not the start switch of copying is turned on in the operation unit 70 (ACT111). If the start switch is turned on (ACT111: YES), the control unit 82 determines the size of the original document (ACT112). If the start switch is not turned on (ACT111: NO), the control unit 82 executes the second original document size determination (ACT120). In ACT 112, the control unit 82 determines the size of the original document based on the detection position at which the APS signal and the luminance value is greater than the first threshold value. For example, if the detection positions at which the luminance values is greater than the first threshold value are AP1 to AP4 and the APS signal is detected, the control unit 82 determines that the size of the original document is B4.

After the size of the original document is determined, the carriage driving portion 860 operates to move the first carriage 102 to a standby position (ACT113).

In the process of ACT105, if the start switch is turned on (ACT105: YES), the second determination portion 872 acquires the APS signal (ACT114).

The image processing portion 840 executes the image reading operation and the shading correction (ACT115). The calculation portion 880 calculates the first threshold value, similarly to the process of ACT109 (ACT116).

Similarly to the process of ACT110, the second determination portion 872 determines whether or not the respective luminance values at the detection positions AP1 to AP5 are greater than the first threshold value. The second determination portion 872 stores the detection position, at which the luminance value is greater than the first threshold value, in the storage unit 73 (ACT117).

Figure 12:
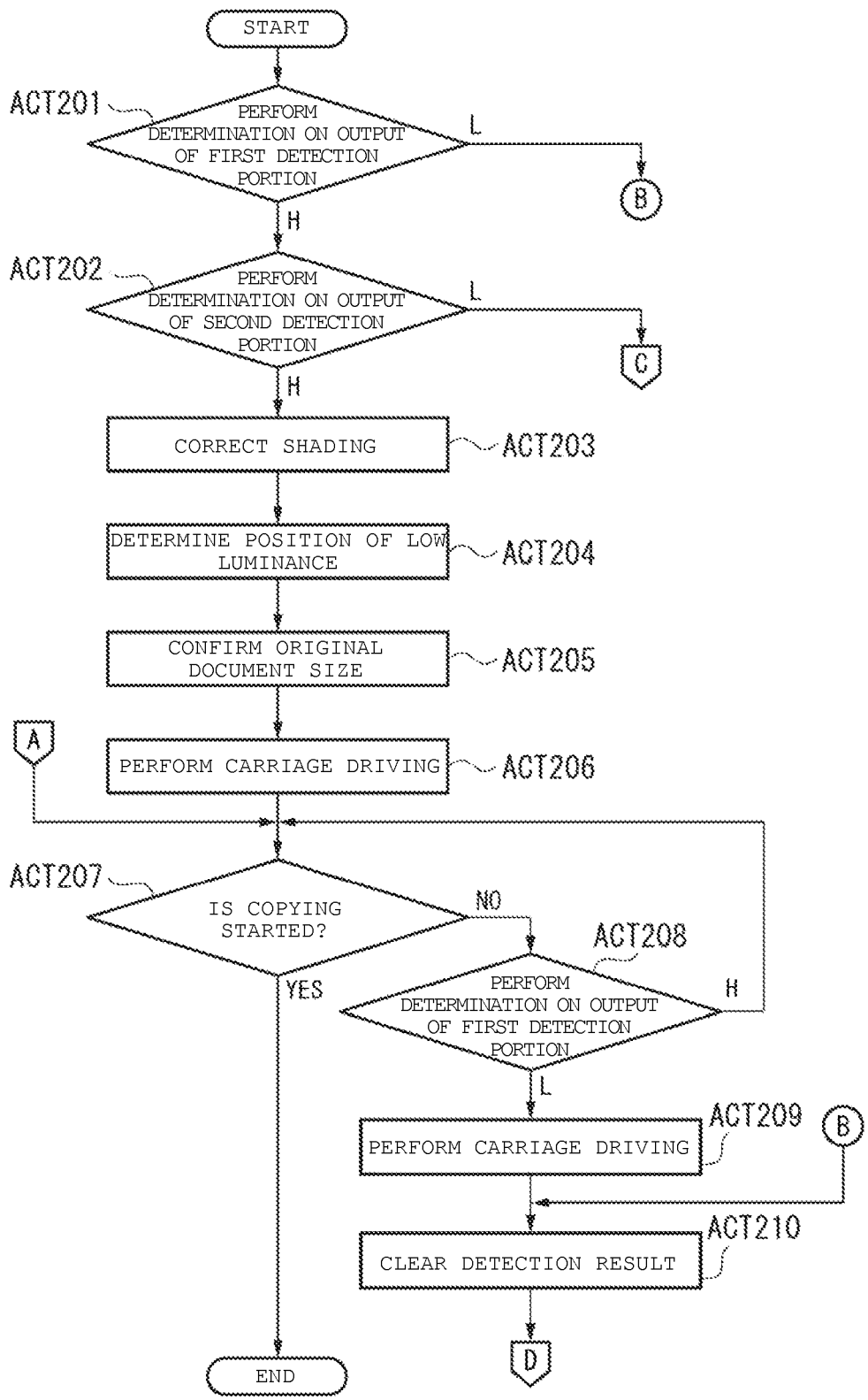
FIG. 12 is a flow chart of an operation of second original document size detection according to the embodiment.

Next, the second original document size determination will be described with reference to FIG. 12.

The first determination portion 871 determines whether the output of the first detection portion 135 is at the L level or the H level (ACT201). If the output of the first detection portion 135 is at the H level, the second determination portion 872 determines the output of the second detection portion 136 (ACT202). If the output of the first detection portion 135 is at the L level, the control unit 82 clears the detection result of the first original document size determination (ACT210).

The second determination portion 872 determines whether the output of the second detection portion 136 is the L level or the H level (ACT202). If the output of the second detection portion 136 is at the L level, the control unit 82 executes the process of ACT112. If the output of the second detection portion 136 is at the H level, the image processing portion 840 executes the image reading operation and the shading correction (ACT203).

The control unit 82 detects whether or not the original document with low luminance value is present at each position of the detection positions AP1 to AP5. The control unit 82 turns on the light source 101. The calculation portion 880 acquires the luminance value at the detection position APT from the line sensor 106. The second determination portion 872 acquires the luminance values at the detection positions AP1 to AP5 from the line sensor 106. The second determination portion 872 determines whether or not the respective luminance values at the detection positions AP1 to AP5 are equal to or smaller than the second threshold value. The second determination portion 872 stores the detection position, at which the luminance value is equal to or less than the second threshold value and the luminance value thereof in the storage unit 73 (ACT204).

The control unit 82 reads the output data which is stored in the storage unit 73 through the first original document size determination and the second original document size determination. Then, the control unit 82 determines the size of the original document, based on a first original document size determination result, a second original document size determination result, and the APS signal (ACT205).

After the size of the original document is determined, the carriage driving portion 860 moves the first carriage 102 to the standby position (ACT206).

The control unit 82 determines whether or not the start switch of copying is turned on through the operation unit 70 (ACT207). If the start switch is turned on (ACT207:YES), the control unit 82 ends the second original document size determination. If the start switch is not turned on (ACT207: NO), the first determination portion 871 determines whether the output of the first detection portion 135 is the L level or the H level (ACT208). If the output of the first detection portion 135 is at the L level, the carriage driving portion 860 moves the first carriage 102 to a predetermined position (ACT209). If the output of the first detection portion 135 is at the H level, the control unit 82 re-determines whether or not a start switch of copying is turned on through the operation unit 70 (ACT207). The control unit 82 clears the detection result of the first original document size determination (ACT210). After clearing the detection result of the first original document size determination, the control unit 82 advances the current process to the process of ACT105.

According to at least one embodiment mentioned above, the image reading device 1 according to the embodiment includes the line sensor 106, the platen cover 12, the opening-closing position sensor unit 13, the calculation portion 880, and the determination portion 870. The line sensor 106 is operated to determine the size of the original document in the main scanning direction based on the output signal which is obtained by scanning the original document in the main scanning direction. The platen cover 12 presses the original document against the reading surface. The opening-closing position sensor unit 13 detects a position of the platen cover 12 between opening and closing of the cover. If it is detected that the platen cover 12 is at the half-closed position, the calculation portion 880 calculates the detection threshold value from data of the region other than the position in which the original document will be placed. The determination portion 870 determines the size of the original document based on the output signal and the predetermined threshold value. Thereby, it is possible to precisely determine the size of the original document in the process of the operation of closing the platen cover 12.

Further, the whole or some of the functions of the above-mentioned image reading device may be implemented by programs, and the programs for implementing such functions may be recorded in a computer readable recording medium. In addition, the functions may be implemented by executing the programs recorded in a recording medium.

Further, the "computer readable recording medium" is defined to include a portable medium and a storage unit. Examples of the portable medium include a flexible disk, a magneto-optical disc, a ROM, and a CD-ROM. For example, the storage unit is a hard disk which is built in a computer system. Furthermore, the "computer readable recording medium" is defined to include a unit that dynamically holds the programs during the short time in a network and a unit that holds the programs during a constant time. For example, the network is the Internet. For example, the unit that dynamically holds the programs is a communication line in a case where the programs are transmitted through a communication link. For example, the unit that holds the programs during a constant time is a volatile memory inside the computer system used as the server or the client. Further, the programs may implement some of the above-mentioned functions. Furthermore, the above-mentioned functions may be implemented by combination of the programs recorded in the computer system in advance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image reading device comprising:
a plate on which a document to be scanned is placed;
a cover that is movable between an open position and a closed position at which the cover contacts the document;
a position sensor configured to detect a position of the cover;
an imaging unit configured to emit light towards the plate and having an image sensor configured to detect light reflected by the document; and
a control unit configured to determine whether or not a region of the plate is covered by the document based on a detection result of the position sensor and a detection result of the image sensor and determine a size of the document based on the determination of whether or not the region of the plate is covered by the document, wherein
the region of the plate is determined to be covered by the document, when a detection value of the image sensor is greater than a first value and when the detection value of the image sensor is smaller than a second value.

2. The image reading device according to claim 1, wherein the control unit is further configured to use the first value for determining whether or not the region of the plate is covered by the document when the detected position of the cover is at a position between the open position and the closed position, and use the second value for determining whether or not the region of the plate is covered by the document when the detected position of the cover is at the closed position, the second value being greater than the first value.

3. The image reading device according to claim 2, further comprising:
a storage unit storing the first value and the second value.

4. The image reading device according to claim 2, further comprising:
a reference plate, wherein
the control unit is further configured to calculate the first value based on a first detection value of the image sensor that is obtained when the image sensor detects light reflected by the reference plate and a second detection value of the image sensor that is obtained when the image sensor detects light coming from outside the image reading device through a space between the plate and the cover.

5. The image reading device according to claim 4, wherein the first value is an average value of the first detection value and the second detection value.

6. The image reading device according to claim 1, wherein the cover is rotatable around a rotational axis, and
the position sensor detects a rotational position of the cover.

7. The image reading device according to claim 1, wherein the position sensor is further configured to output, as the detection result, a first output when the cover is at the closed position, a second output when the cover is at a position between the open position and the closed position, and a third output when the cover is at the open position.

8. A method for determining a size of a document to be scanned, comprising:
detecting a position of a cover that is movable between an open position and a closed position at which the cover contacts the document;
detecting light emitted from a light source and reflected by the document;
determining whether or not a region of a plate is covered by the document based on a detection result of the position of the cover and a detected result of the light; and
determining the size of the document based on the determination of whether or not the region of the plate is covered by the document, wherein
the region of the plate is determined to be covered by the document, when a detection value of the image sensor is greater than a first value and when the detection value of the image sensor is smaller than a second value.

9. The method according to claim 8, wherein
the first value is used for the determination of whether the region of the palate is covered by the document when the detected position of the cover is at a position between the open position and the closed position, and the second value, which is greater than the first value is used for the determination of whether the region of the plate is covered by the document when the detected position of the cover is at the closed position.

10. The method according to claim 9, further comprising:
storing the first value and the second value.

11. The method according to claim 9, further comprising:
detecting light emitted from the light source and reflected by a reference plate;
outputting a first detection value corresponding to an intensity of a detected light reflected by the reference plate;
detecting light coming from an outside through a space between the plate and the cover;
outputting a second detection value corresponding to an intensity of the detected light coming from the outside; and
calculating the first value based on the first and second detection values.

12. The method according to claim 11, further comprising:
the first value is an average value of the first detection value and the second detection value.

13. The method according to claim 8, wherein
the cover is rotatable around a rotational axis, and
a rotational position of the cover is detected as the position of the cover.

14. The method according to claim 8, wherein
as the detection result of the position of the cover, a first output is output when the cover is at the closed position, a second output is output when the cover is at a position between the open position and the closed position, and a third output is output when the cover is at the open position.

15. An image forming apparatus comprising:
an image reading device configured to scan an image of a document; and
an image forming device configured to form an image corresponding to a scanned image, wherein the image reading device includes
a plate on which the document is placed,
a cover that is movable between an open position and a closed position at which the cover contacts the document,
a position sensor configured to detect a position of the cover, an image sensor unit configured to emit light towards the plate and having an image sensor configured to detect light reflected by the document, and a control unit configured to determine whether or not a region of the plate is covered by the document based on a detection result of the position sensor and a detection result of the image sensor and determine a size of the document based on the determination of whether or not the region of plate is covered by the document, wherein the region of the plate is determined to be covered by the document, when the detection value of the image sensor is greater than a first value and when the detection value of the image sensor is smaller than a second value.

16. The image forming apparatus according to claim 15, wherein the control unit is further configured to use the first value for determining whether or not the region of the plate is covered by the document when the detected position of the cover is at a position between the open position and the closed position, and use the second value for determining whether or not the region of the plate is covered by the document when the detected position of the cover is at the closed position, the second value being greater than the first value.

17. The image forming apparatus according to claim 16, further comprising:

a storage unit storing the first value and the second value.

18. The image forming apparatus according to claim 16, further comprising:

a reference plate, wherein the control unit is further configured to calculate the first value based on a first detection value of the image sensor that is obtained when the image sensor detects light reflected by the reference plate and a second detection value of the image sensor that is obtained when the image sensor detects light coming from outside the image reading device through a space between the plate and the cover.

19. The image forming apparatus according to claim 18, wherein the first value is an average value of the first detection value and the second detection value.

20. The image forming apparatus according to claim 15, wherein the cover is rotatable around a rotational axis, and the position sensor detects a rotational position of the cover.

* * * * *